United States Patent
Good et al.

(10) Patent No.: US 10,494,082 B2
(45) Date of Patent: Dec. 3, 2019

(54) SYSTEMS FOR LATCHING AND LOCKING A FOLDING WING

(71) Applicant: The Boeing Company, Chicago, IL (US)

(72) Inventors: Mark S. Good, Seattle, WA (US); Matthew A. Lassen, Seattle, WA (US)

(73) Assignee: The Boeing Company, Chicago, IL (US)

( * ) Notice: Subject to any disclaimer, the term of this patent is extended or adjusted under 35 U.S.C. 154(b) by 358 days.

(21) Appl. No.: 15/428,304

(22) Filed: Feb. 9, 2017

(65) Prior Publication Data

US 2017/0152017 A1    Jun. 1, 2017

Related U.S. Application Data (63) Continuation-in-part of application No. 14/165,561, filed on Jan. 27, 2014, now Pat. No. 9,580,166.

(51) Int. Cl.
    *B64C 3/56* (2006.01)

(52) U.S. Cl.
    CPC ............. *B64C 3/56* (2013.01); *Y02T 50/14* (2013.01); *Y10T 403/32254* (2015.01)

(58) Field of Classification Search
    CPC .... B64C 3/56; B64C 3/26; B64C 3/38; B64C 2201/102; B64C 37/00; B64C 1/26; B64C 1/063; B64C 5/10; Y02T 50/145; Y10T 403/32254
    See application file for complete search history.

(56) References Cited

U.S. PATENT DOCUMENTS

| | | | |
|---|---|---|---|
| 5,201,479 | A | 4/1993 | Renzelmann |
| 5,310,138 | A | 5/1994 | Fitzgibbon |
| 5,350,135 | A | 9/1994 | Renzelmann et al. |
| 5,381,986 | A | 1/1995 | Smith et al. |
| 5,427,329 | A | 6/1995 | Renzelmann et al. |
| 5,452,643 | A | 9/1995 | Smith et al. |
| 5,558,299 | A | 9/1996 | Veile |
| 6,260,799 | B1 | 7/2001 | Russ |
| 8,210,473 | B2 | 7/2012 | Schweighart et al. |
| 9,211,946 | B2 | 12/2015 | Good et al. |
| 2010/0019080 | A1 | 1/2010 | Schweighart et al. |
| 2013/0099060 | A1 | 4/2013 | Dees et al. |
| 2013/0327883 | A1 | 12/2013 | Kordel et al. |
| 2014/0061371 | A1 | 3/2014 | Good et al. |
| 2014/0117150 | A1 | 5/2014 | Good et al. |
| 2014/0319268 | A1 | 10/2014 | Lassen et al. |

(Continued)

FOREIGN PATENT DOCUMENTS

| | | |
|---|---|---|
| EP | 2650212 A1 | 10/2013 |
| EP | 2899119 A1 | 7/2015 |

(Continued)

OTHER PUBLICATIONS

Search Report for related European Application No. EP17201243.7; report dated Mar. 9, 2018.

*Primary Examiner* — Benjamin P Lee
(74) *Attorney, Agent, or Firm* — Miller, Matthias & Hull LLP (57) ABSTRACT

A folding wing comprises a fixed section, a folding section, and a latch system for latching the folding section to the fixed section. The latch system includes a plurality of latch pins, and a corresponding plurality of non-backdriveable mechanical actuators for extending the latch pins to engage the folding section.

19 Claims, 10 Drawing Sheets

(56) References Cited

U.S. PATENT DOCUMENTS

2015/0014478 A1 1/2015 Lassen et al.
2015/0360770 A1 12/2015 Good
2016/0251073 A1 9/2016 Good et al.

FOREIGN PATENT DOCUMENTS

SYSTEMS FOR LATCHING AND LOCKING A FOLDING WING

FIELD

The present disclosure generally relates to aircraft having folding wings, and more particularly to systems for latching and locking folding wings in fully deployed positions.

BACKGROUND

Historically, folding wings have been commonly used in naval aircraft. Folding wings enable naval aircraft to occupy less space in confined aircraft carrier hangars.

More recently, folding wings have been used on commercial aircraft. Folding wings may be stowed to fit within airport parking areas and taxiways, and they may be deployed prior to takeoff to increase wing span. Longer span wings are more aerodynamically efficient than shorter wings.

SUMMARY

In accordance with one aspect of the present disclosure, a folding wing includes a fixed section, a folding section hinged to the fixed section, and a latch system for latching the folding section to the fixed section. The latch system includes a plurality of latch pins, each latch pin movable along a latch pin axis between a retracted position, in which the latch pin is disengaged from the folding section, and an extended position, in which the latch pin engages the folding section. A corresponding plurality of non-backdriveable mechanical latch pin actuators is provided, each being coupled to an associated latch pin. A drive line is mechanically coupled to each of the plurality of non-backdriveable mechanical latch pin actuators. A first motor is mechanically coupled to the drive line, and a second motor mechanically coupled to the drive line independently of the first motor.

In accordance with another aspect of the present disclosure, a folding wing includes a fixed section, a folding section hinged to the fixed section, and a latch system for latching the folding section to the fixed section. The latch system includes a plurality of latch pins, each latch pin movable along a latch pin axis between a retracted position, in which the latch pin is disengaged from the folding section, and an extended position, in which the latch pin engages the folding section; a corresponding plurality of non-backdriveable mechanical latch pin actuators, each non-backdriveable mechanical latch pin actuator being coupled to an associated latch pin; a drive line mechanically coupled to each of the plurality of non-backdriveable mechanical latch pin actuators; a latch manual drive interface mechanically coupled to the drive line; a corresponding plurality of locks, each lock having an associated latch pin and being rotatable about a lock axis between an unlocked position and a locked position, wherein each lock, when in the locked position, is configured to create physical interference with the associated latch pin; an unlock actuator operably coupled to the plurality of locks by a linkage; and a lock manual drive interface mechanically coupled to the linkage.

In accordance with a further aspect of the present disclosure, a latch system is provided for latching a folding section of a wing to a fixed section of the wing. The system includes a plurality of latch pins, each latch pin movable along a latch pin axis between a retracted position, in which the latch pin is disengaged from the folding section, and an extended position, in which the latch pin engages the folding section, and a corresponding plurality of non-backdriveable mechanical latch pin actuators, each non-backdriveable mechanical latch pin actuator being coupled to an associated latch pin. A drive line is mechanically coupled to each of the plurality of non-backdriveable mechanical latch pin actuators, and a latch manual drive interface is mechanically coupled to the drive line. A corresponding plurality of locks is provided, each lock having an associated latch pin and being rotatable about a lock axis between an unlocked position and a locked position, wherein each lock, when in the locked position, is configured to create physical interference with the associated latch pin. An unlock actuator is operably coupled to the plurality of locks by a linkage, and a lock manual drive interface mechanically coupled to the linkage. A first motor and a second motor are mechanically coupled to the drive line.

The features, functions, and advantages can be achieved independently in various embodiments or may be combined in yet other embodiments, further details of which can be seen with reference to the following description and drawings.

It should be understood that the drawings are not necessarily drawn to scale and that the disclosed embodiments are sometimes illustrated schematically. It is to be further appreciated that the following detailed description is merely exemplary in nature and is not intended to limit the invention or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
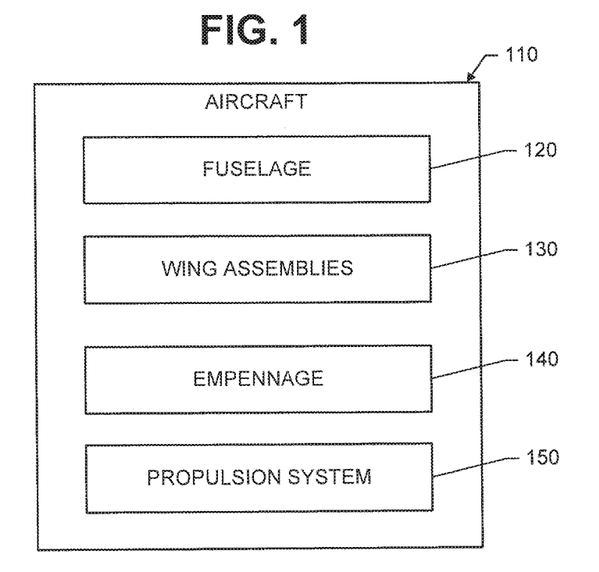
FIG. 1 is an illustration of an aircraft including folding wing assemblies.

Reference is made to FIG. 1, which illustrates an aircraft 110 including a fuselage 120, folding wing assemblies 130, and empennage 140. One or more propulsion units 150 are coupled to the fuselage 120, wing assemblies 130 or other portions of the aircraft 110. Each wing assembly 130 includes a fixed inboard section and a folding outboard section. The folding section is hinged to the fixed section for movement between a stowed position and a deployed position.

The fixed inboard section may be a main wing or an inboard section thereof. The folding outboard section may be a wing tip or an outboard section of the main wing.

The fixed inboard section typically includes moveable flight control surfaces (e.g., ailerons, slats, flaps). The folding outboard section may or may not include moveable flight control surfaces.

Figures 2A, 2B:
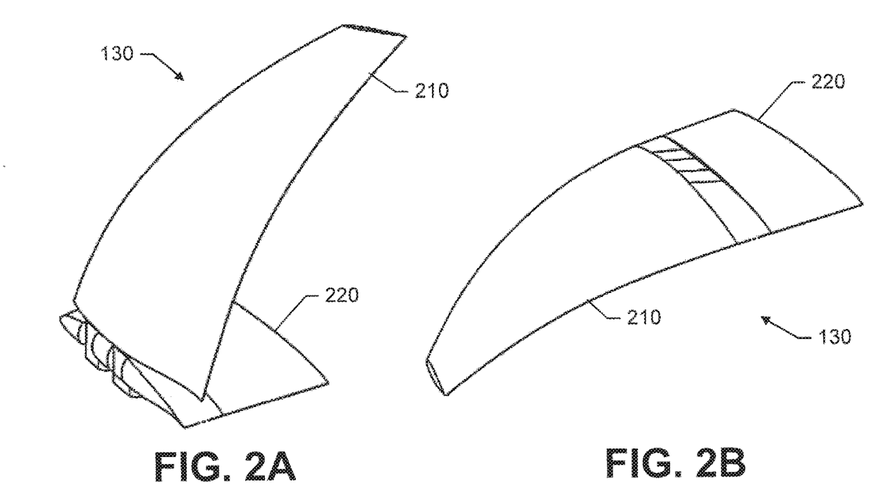
FIGS. 2A and 2B are illustrations of a folding wing tip in a stowed position and a deployed position, respectively.

FIGS. 2A and 2B illustrate a wing assembly 130 including a folding wing tip 210 hinged to a fixed main wing 220. FIG. 2A shows the wing tip 210 in a stowed position, and FIG. 2B shows the wing tip 210 in a deployed position.

Figure 3:
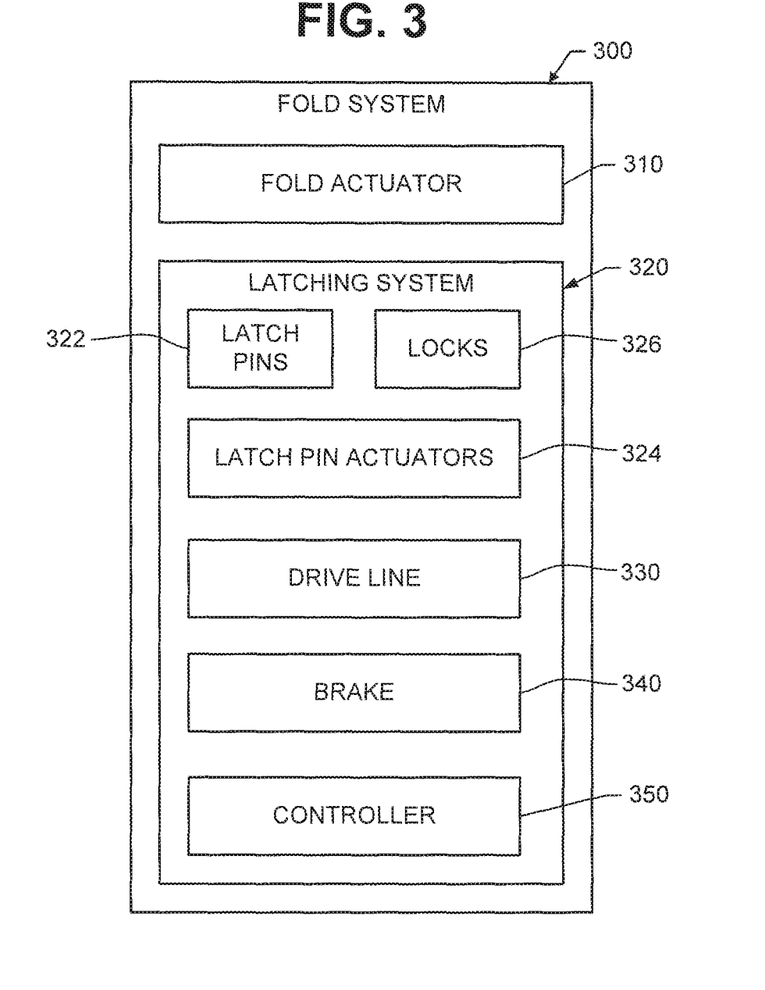
FIG. 3 is an illustration of a system for stowing and deploying a folding wing.

Reference is now made to FIG. 3, which illustrates a fold system 300 for stowing and deploying a folding wing having a folding section that is hinged to a fixed section. The fold system 300 includes a fold actuator 310 for rotating the folding section about a hinge line between the stowed position and the deployed position. The fold actuator 310 may include a rotary actuator. Examples of the rotary actuator include, but are not limited to, a conventional planetary gearbox, a rotary vane hydraulic actuator, and a hydraulic actuator that has a linear piston pushing against a helical screw.

The fold system 300 further includes a latching system 320 including a plurality of latch pins 322 and a corresponding plurality of mechanical latch pin actuators 324. Each latch pin actuator 324 extends and retracts its latch pin 322. The latch pins 322 are extended into engagement with the folding section when the folding section is fully deployed. The latch pins 322 can take flight loads. The latch pins 322 are retracted to disengage the folding section, thereby allowing the folding section to be rotated back to the stowed position.

Each mechanical latch pin actuator 324 is non-backdriveable so as to lock its corresponding latch pin 322. This feature prevents the latch pin 322 from disengaging the folding section.

The latching system 320 may further include redundant locks 326 for the latch pins 322. Each lock 326 is movable to create physical interference with its corresponding latch pin 322 to ensure that the latch pin 322 remains engaged with the folding section. For example, the locks 326 include cams that flip down behind the latch pins 322. The locks 326 provide dissimilar redundancy to the non-backdriveable latch pin actuators 324.

A drive line 330 may be used to transmit mechanical power to the latch pin actuators 324. A brake 340 may be provided for the drive line 330. By braking the drive line 330 while the folding section is latched and locked in the deployed position, the latching system 320 provides additional dissimilar redundancy to the non-backdriveable latch pin actuators 324.

The latching system 320 further includes a controller 350 for commanding the operation of the fold actuator 310 and the latching system 320. The controller 350 may be microprocessor-based. The controller 350 may communicate with a flight computer (not shown) to determine when to deploy or stow the folding section, and when to lock and latch the folding section.

The latching system 320 may further comprise sensors for sensing displacement of the latch pins 322. The controller 350 may use this sensor information to synchronize the displacement of the latch pins 322 and confirm that the locks 326 have been engaged.

FIGS. 4A-4D illustrate a latching system 410 for a folding wing 400 including a folding section 402 hinged to a fixed section 404 at a hinge line HL. The latching system 410, which is mounted to the fixed section 404, includes latch pins 420 that are inline and are oriented parallel to the hinge line HL. A mechanical latch pin actuator 430 is provided for each latch pin 420. A motor 440 generates rotary power, and a torque shaft 450 and gearboxes 460 transmit the rotary power to the latch pin actuators 430. The rotary power is provided to the latch pin actuators 430 simultaneously.

Each latch pin actuator 430 may include a housing 432, and a gear 434 and roller screw 436 for moving the latch pin 420 in and out of the housing 432. The roller screw 436 is configured to be non-backdriveable. Pitch of the roller screw 436 may be selected so that the roller screw 436 can be turned in one direction by the motor 440, but not turned in an opposite direction by forces acting along an axis of the latch pin 420 (e.g., pushing on the latch pin 420).

Each latch pin actuator 430 is also provided with a lock 438 that is biased towards a locking position by a spring 439. Thus, when the latch pin 420 is extended, the spring 439 forces the locks 438 into a position that prevents the latch pin 420 from being retracted.

Linkages 480 may connect the locks 438 serially with an unlock actuator 470. When actuated, the unlock actuator 470 may rotate the locks 438 simultaneously into an unlock position, which allows the latch pins 420 to be retracted.

Figure 4A:
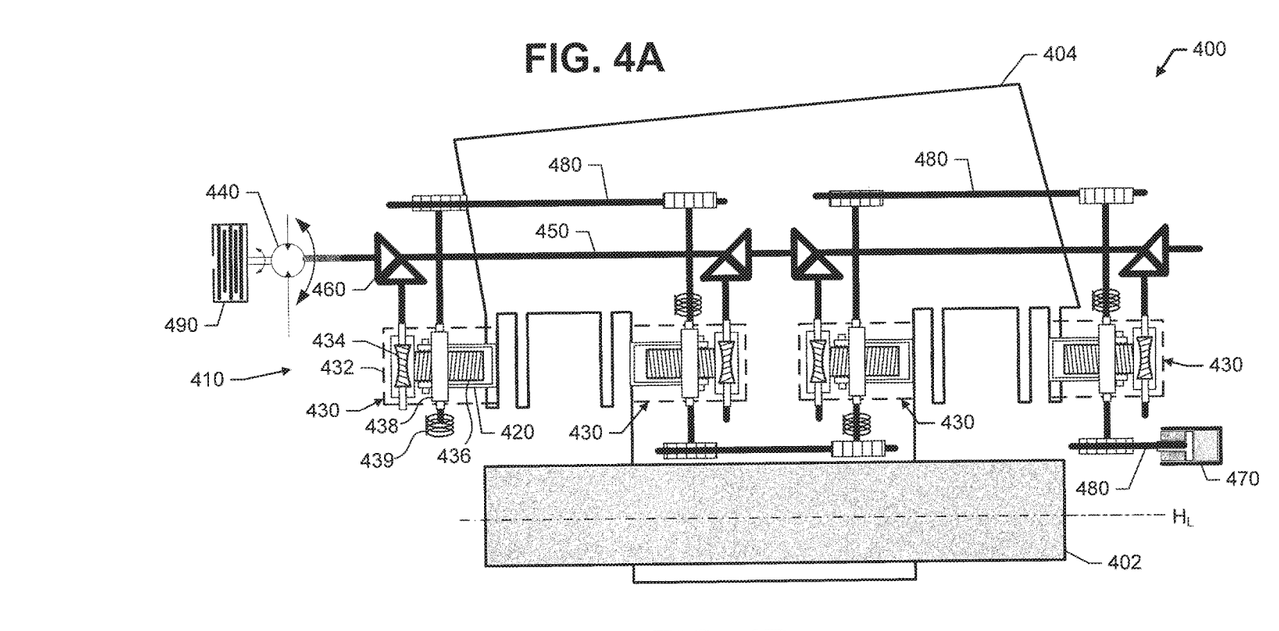
FIGS. 4A-4D are illustrations of a latching system including a first arrangement of latch pins.
Figure 4B:
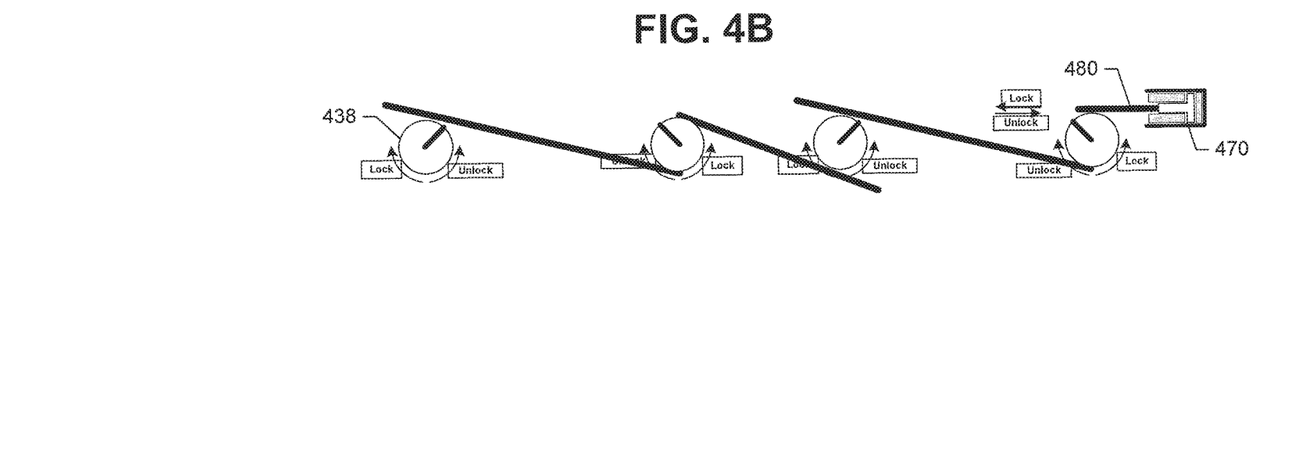

FIG. 4A illustrates the folding wing 400 with the folding section 402 stowed and the latching system 410 in an unlatched state. The latch pins 420 are fully retracted. FIG. 4B illustrates the positions of the locks 438 in an unlocked state.

The folding section 402 may be deployed by moving it about the hinge line HL. Once the folding section 402 is deployed, the motor 440 turns the torque shaft 450, which (via the gearboxes 460) turns the gears 434 and roller screws 436. As a result, the latch pins 420 are extended through shear plates and/or torque boxes in both the fixed and folding sections (404 and 402, respectively), thereby latching the folding section 402 to the fixed section 404.

Figure 4C:
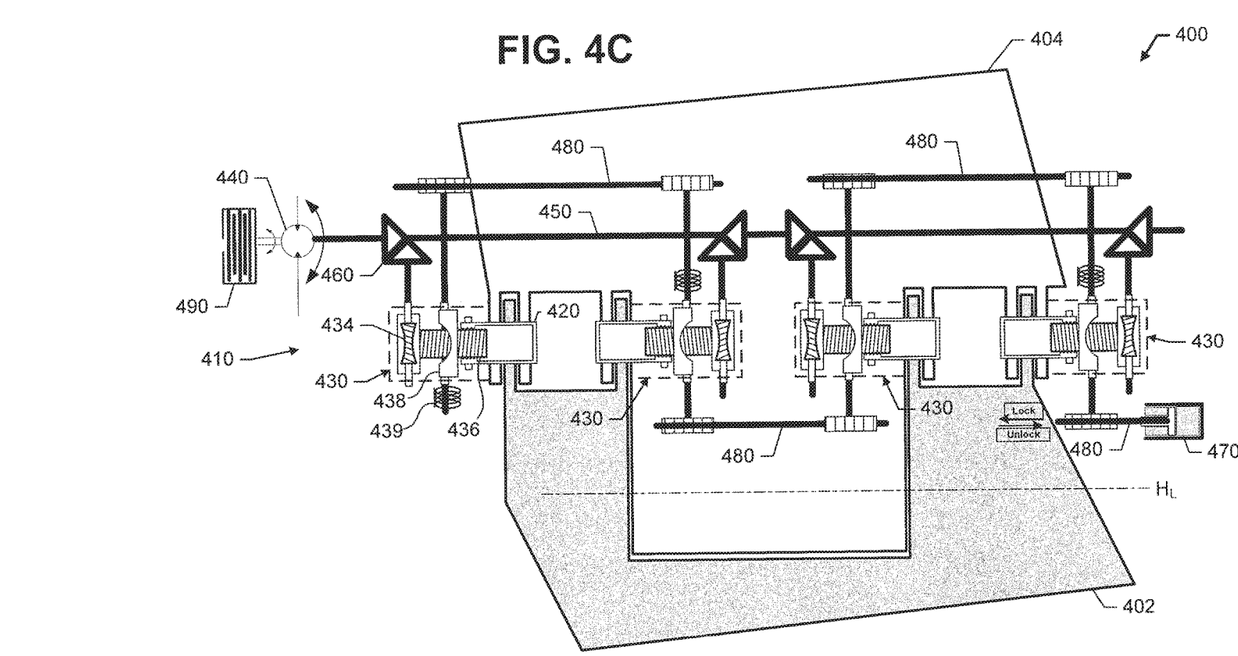

FIG. 4C shows the folding wing 400 with the folding section 402 in the deployed position and the latching system 410 in a latched and locked state. The latch pins 420 extend through shear plates and/or torque boxes in the folding and fixed sections (402 and 404, respectively).

Figure 4D:
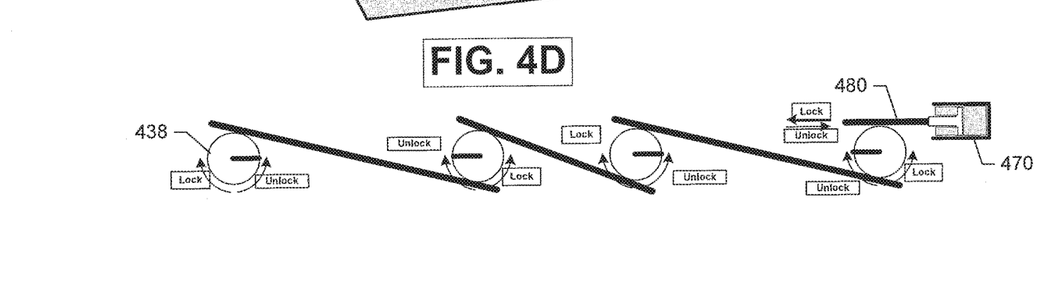

The latch pins 420 are locked automatically. The springs 439 force the locks 438 into a position that prevents the latch pins 420 from being retracted.

A brake 490 may also be applied to the torque shaft 450. Thus, the latch pins 420 are locked with two levels of redundancy: non-backdrivability of the mechanical latch pin actuators 430, braking of the torque shaft 450, and mechanical interference by the locks 438.

When it becomes time to stow the folding section 402, the unlock actuator 470 is actuated to rotate the locks 438 to an unlocked position, the brake 490 is released, and the gears 434 and roller screws 436 are turned to retract the latch pins 420 into their housings 432. The folding section 402 is then moved about the hinge line HL to the stowed position.

Figure 5:
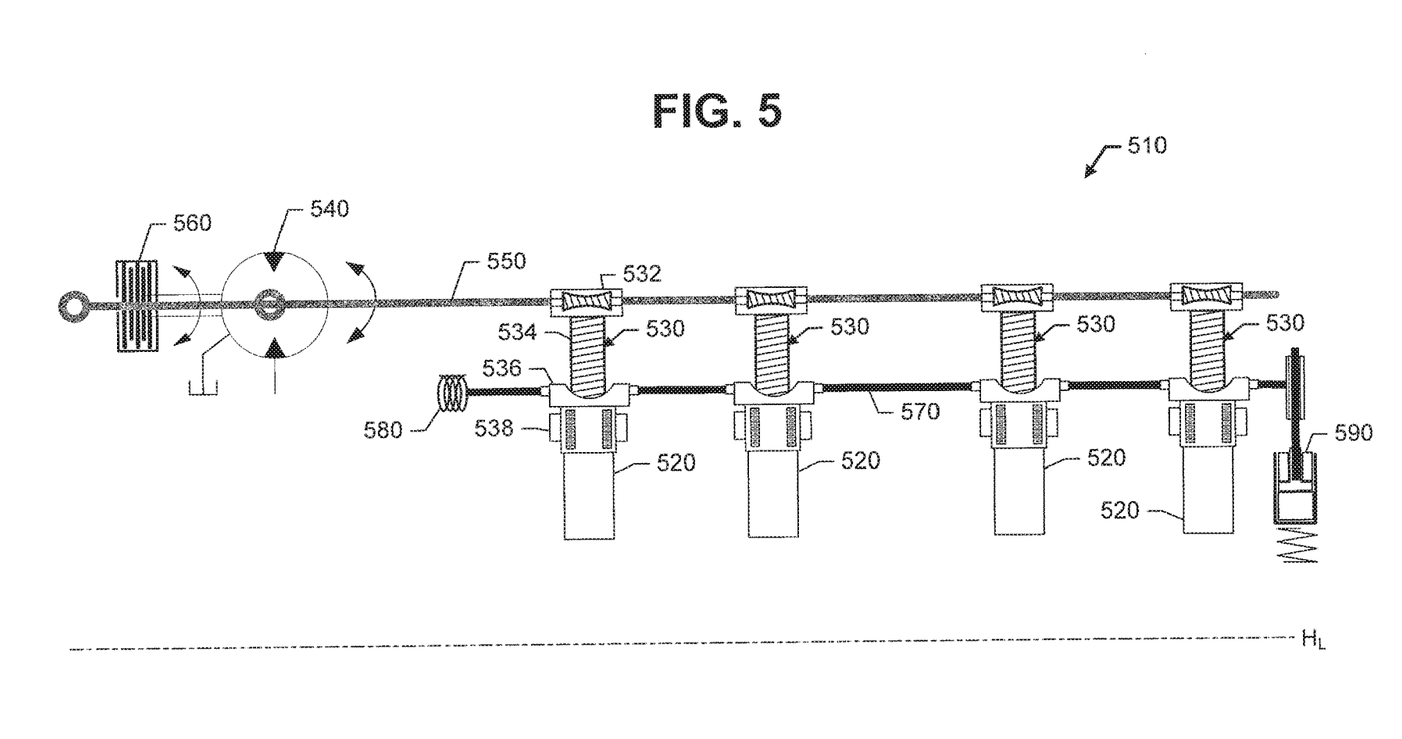
FIG. 5 is an illustration of a latching system including a second arrangement of latch pins.

Reference is now made to FIG. 5, which illustrates a latching system 510 for a folding wing (not illustrated). The folding wing includes a folding portion hinged to a fixed portion about a hinge line HL. The latching system 510 may be mounted to the fixed section of the folding wing.

The latching system 510 includes latch pins 520 oriented perpendicular to the hinge line HL. The latch pins 520 are fully retracted to enable the folding section to be moved between deployed and folded positions. The latch pins 520 are fully extended to engage the folding portion and latch it to the fixed portion.

The latching system 510 further includes a mechanical latch pin actuator 530 for each latch pin 520. Each latch pin actuator 530 includes a gear 532 and roller screw 534 for extending and retracting the latch pin 520.

A drive line includes a motor 540 for generating rotary power, and a torque shaft 550 for transmitting the rotary power to the gears 532 of the latch pin actuators 530. The gears 532 may be in-line and mounted to the torque shaft 550, resulting in a straight path for the drive line. A brake 560 may be coupled to the torque shaft 550.

Each mechanical latch pin actuator 530 may further include a lock 536. Linkages 570 may connect the locks 536 of the different latch pin actuators 530 in serial. A spring 580 biases the locks 536 towards a locked position. When the latch pins 520 are extended, the spring 580 applies the locks 536 to the latch pins 520. An unlock actuator 590 may be used to rotate the locks 536 into an unlock position, which allows the latch pins 520 to be retracted.

In some configurations of a latching system herein, one of the latch pins may be extended into the folding section before extending the other pins. For instance, one latch pin may be longer and closer to engagement than the other latch pins. When all of the latch pins are extended at the same time, the longer latch pin engages the folding section first. In another configuration, one latch pin may be controlled independently of the other latch pins and may be extended before the other latch pins are extended.

Figure 6A:
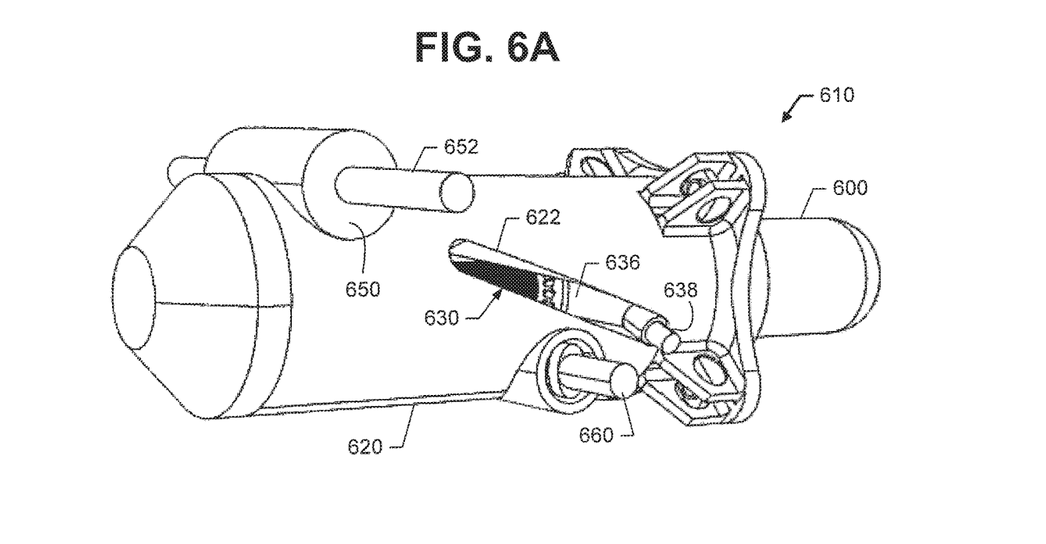
FIGS. 6A-6C are illustrations of a non-backdriveable mechanical actuator for extending and retracting a latch pin.
Figure 6B:
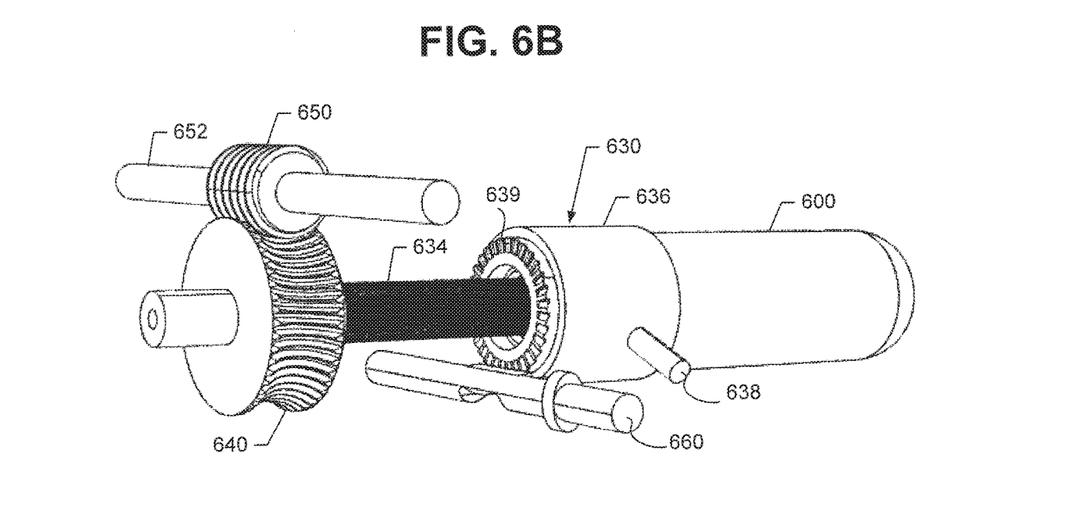
Figure 6C:
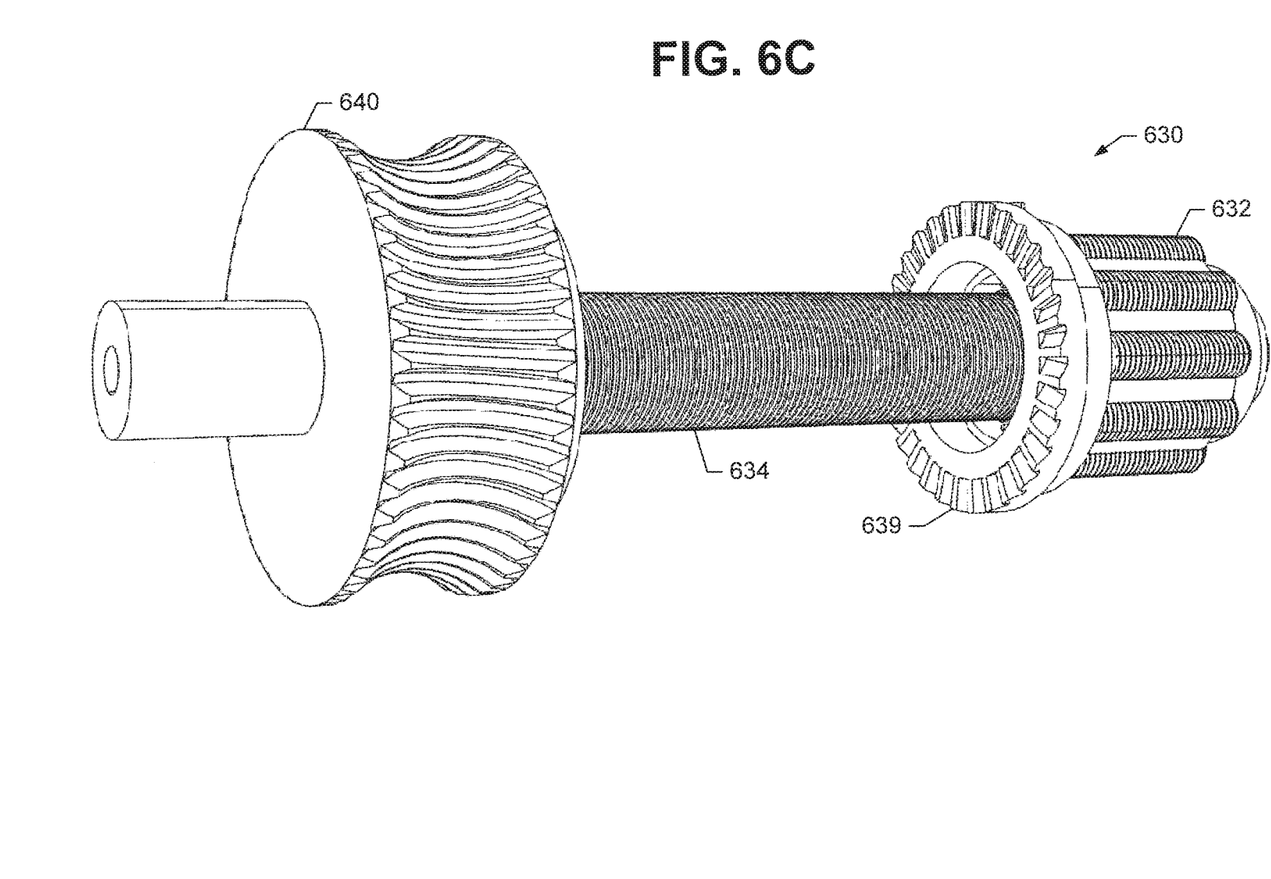

Reference is now made to FIGS. 6A-6C, which illustrates an example of a non-backdriveable mechanical actuator 610 for a latch pin 600. FIG. 6A illustrates a housing 620 for the mechanical actuator 610. FIG. 6B illustrates the mechanical actuator 610 with the housing 620 removed, thereby revealing the following components: a roller screw 630, worm drive 640, 650 and lock 660. FIG. 6C illustrates the roller screw 630 in greater detail.

The roller screw 630 is located within a cavity of the housing 620. The roller screw 630 may include multiple threaded helical rollers 632 assembled in a planetary arrangement around a threaded shaft 634. A threaded nut 636 contains the rollers 632. The threaded shaft 634 is journaled for rotation within the housing 620.

An arm 638 extends outward from the nut 636. The arm 638 rides in a slot 622 in the housing 620. The combination of the arm 638 and the slot 622 prevent the nut 636 from spinning relative to the housing 620. As a result, rotation of the threaded shaft 634 is converted into linear movement of the nut 636.

The nut 636 is connected to the latch pin 600. Rotating the threaded shaft 634 in one direction causes the latch pin 600 to move towards a retracted position. Rotating the threaded shaft 634 in the opposite direction causes the latch pin 600 to move towards an extended position. When the latch pin 600 is fully retracted, it is entirely inside the housing 620. When the latch pin 600 is extended, it protrudes from an end of the housing 620. The combination of the nut 636, the arm 638 and the slot 622 defines fully extended and fully retracted positions of the latch pin 600.

The threaded shaft 634 is rotated by the worm drive, which includes a worm gear or wheel 640 at an end of the threaded shaft 634, and a worm 650 that engages the worm wheel 640. The worm 650 may be turned by an input shaft 652.

The roller screw 630 has a pitch that allows the worm drive to turn the threaded shaft 634, but that does not allow the threaded shaft 634 to be turned by forces acting along an axis of the latch pin 600. The pitches on the shaft 634, the rollers 632 and the nut 636 all may have the same number of threads per inch. However, a high number of threads per inch is selected to make the roller screw 630 non-backdriveable.

Figure 8A:
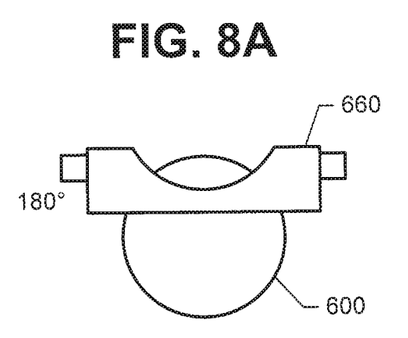
FIGS. 8A and 8B are illustrations of a lock in a locked position and an unlocked position, respectively.
Figure 8B:
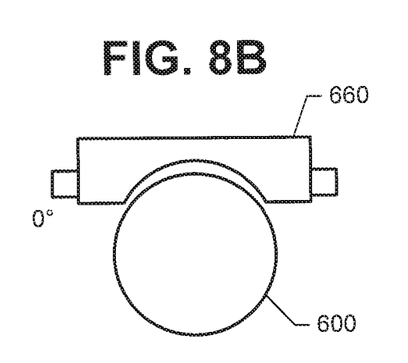

The lock 660 may include a rotating cam that is rotatable between a locked position and an unlocked position. In the locked position, the lock 660 prevents the latch pin 600 from moving via physical interference (FIG. 8A). In the unlocked position, the lock 660 allows the latch pin 600 to be retracted (FIG. 8B). The rotating cam may also include teeth for engaging a roller cage 639 of the roller screw 630.

A standard roller screw 630 is shown in FIG. 6C. However, a mechanical latch pin actuator herein is not so limited. Other configurations may use other types of roller screws, such as inverted, recirculating, and bearing ring roller screws.

Still other configurations of a mechanical latch pin actuator herein may use a different type of screw that is non-backdriveable. For instance, an Acme screw may be used instead of a roller screw.

Some configurations of the mechanical latch pin actuator may use gears other than a worm drive. For instance, spiroid gears may be used to turn the roller screw.

Some configurations of a mechanical latch pin actuator herein may use a lock other than a rotating cam to create physical interference. For example, the lock may include a lock pin extending through the side of the housing 620 perpendicular to the latch pin travel. The lock pin may be actuated by a solenoid.

Figure 7:
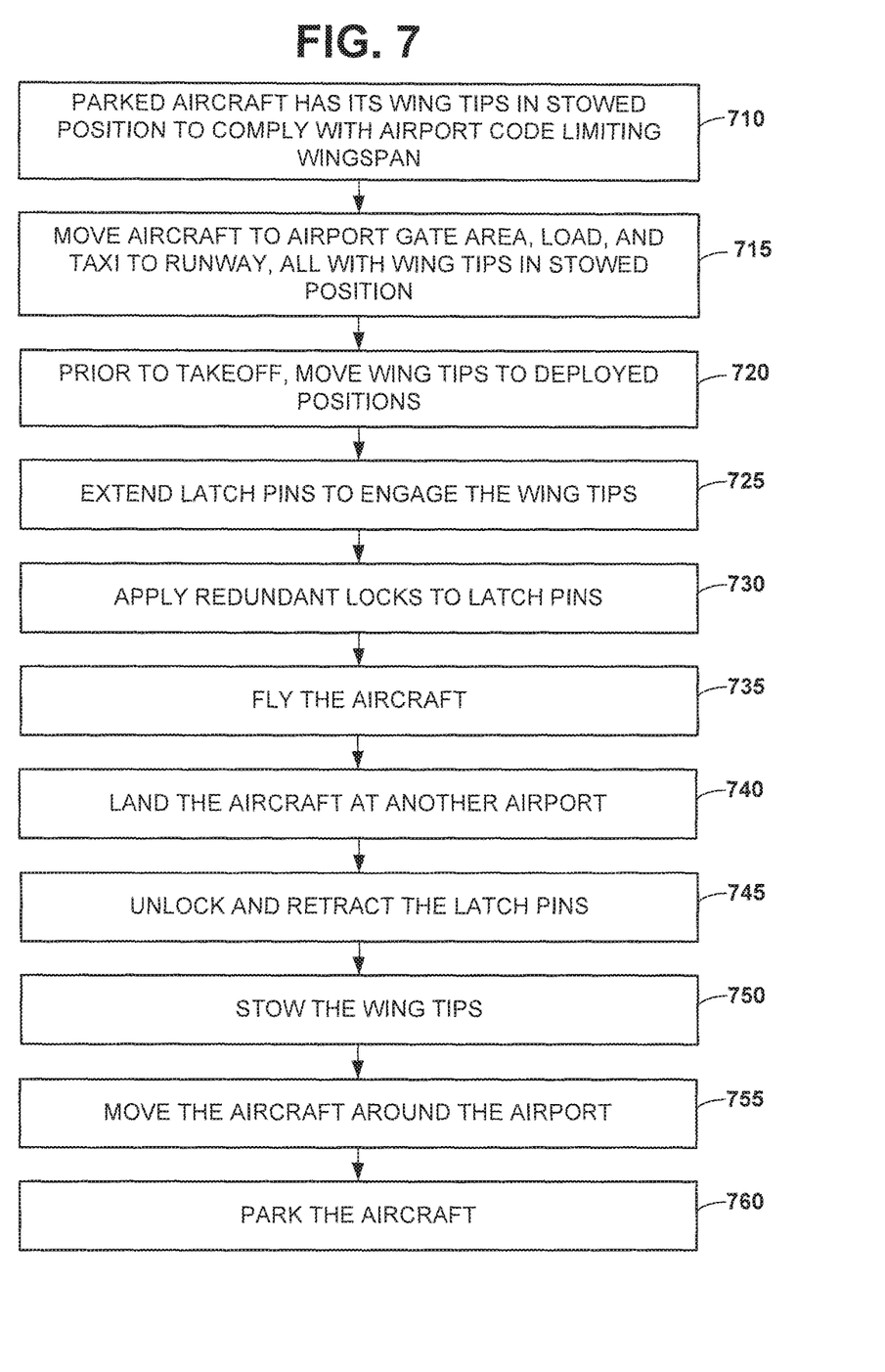
FIG. 7 is an illustration of a method of enhancing performance of a commercial aircraft including wing assemblies with folding wing tips.

Reference is now made to FIG. 7, which illustrates a method of enhancing performance of a commercial aircraft including wings with folding wing tips. At block 710, the aircraft is parked at an airport that places limits on aircraft wingspan length. For instance, the airport is an ICAO Code E airport, which limits wingspan to less than sixty five meters. The aircraft is parked with its wing tips in a stowed position.

At block 715, the aircraft is moved to a gate, loaded, and taxied to a runway. The wing tips remain in the stowed position so the aircraft can fit within taxiways en route to the runway.

At block 720, prior to takeoff, the wing tips are deployed. Fold actuators rotate the wing tips from the stowed position to a deployed position.

At block 725, latch pins are extended to engage the folding wing tips. In this manner, the wing tips are latched to the fixed sections. The non-backdriveable mechanical latch pin actuators ensure that the latch pins are not retracted.

At block 730, redundant locks are applied to the latch pins. The locks are moved into a position that prevents the latch pins from being retracted. Brakes are applied to the torque lines, which further prevents the latch pins from being retracted.

At block 735 the aircraft is flown. With the wing tips extended, wingspan of the aircraft is extended. As a result, aerodynamic efficiency of the aircraft is increased. The greater aerodynamic efficiency results in lower fuel consumption during flight and, therefore, lowers operating costs and increased lift to optimize take-off.

At block 740, the aircraft lands at another airport. If the airport requires the wing tips to be stowed, the locks are unlocked, the brakes are released, and the mechanical actuators retract the latch pins (block 745). With the wing tips now disengaged from the fixed sections, the wings tips are stowed (block 750).

At block 755, the aircraft is moved around the airport. Since the wing tips are stowed, the aircraft complies with airport requirements as it is moved around the airport.

At block 760, the aircraft is parked. Since the wing tips are stowed, the aircraft occupies less space while parked.

Figure 9:
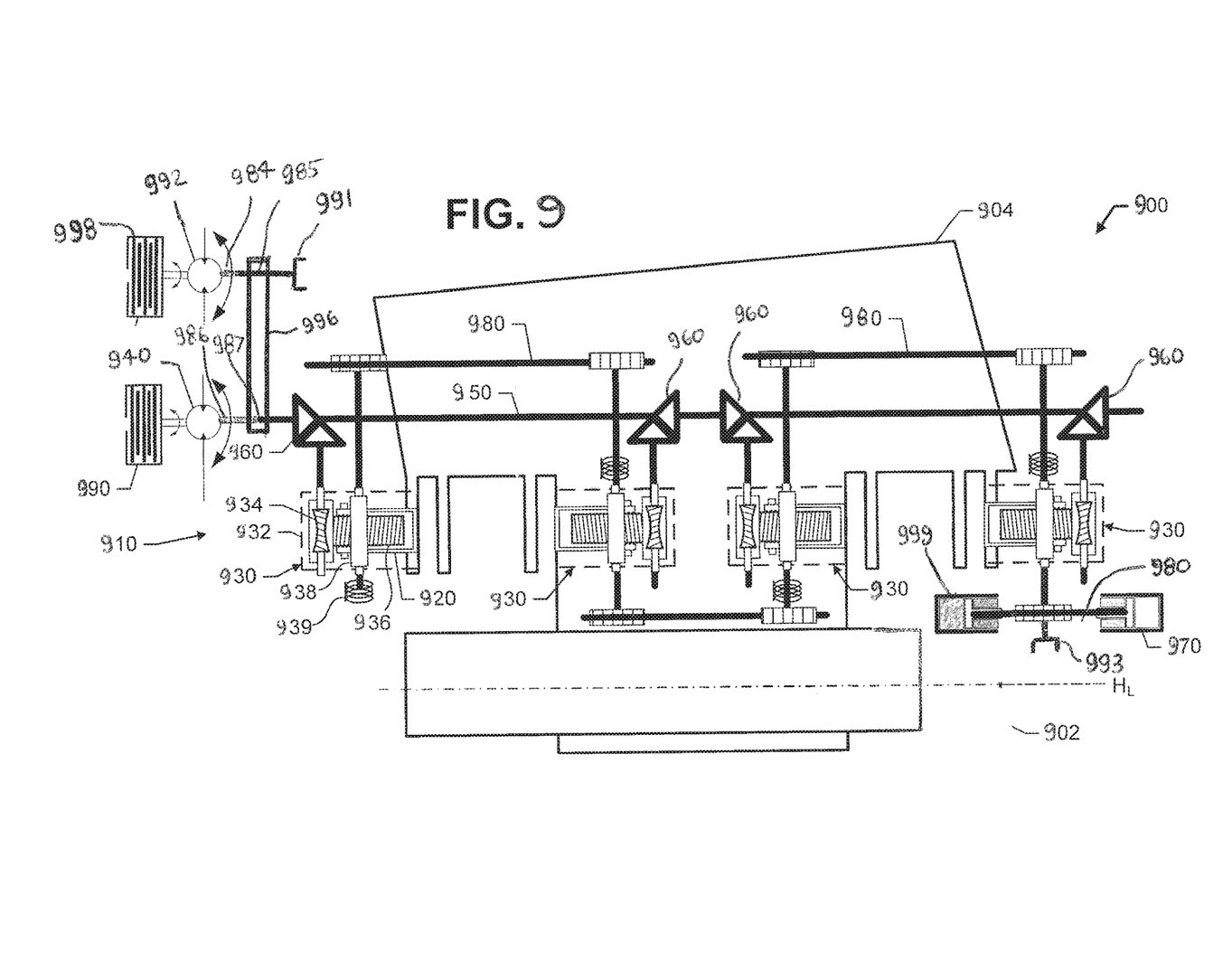
FIG. 9 is an illustration of an alternative embodiment of a latching system including a backup motor and manual drive interfaces.

FIG. 9 illustrates an alternative embodiment of a latching system 910. The latching system 910 is nearly identical to the latching system 410 illustrated in FIGS. 4A-4D, but for the addition of a backup motor and manual drive interfaces, as discussed in greater detail below. Accordingly, the latching system 910 is provided for use with a folding wing 900 including a folding section 902 hinged to a fixed section 904 at a hinge line HL. The latching system 910, which is mounted to the fixed section 904, includes latch pins 920 that are inline and may be oriented parallel to the hinge line HL. A mechanical latch pin actuator 930 is provided for each latch pin 920.

Multiple motors may be used to provide rotary power to the latch pin actuators 930. In some applications, the multiple motors provide redundancy in case one of the motors fails. In other applications, multiple motors may be simultaneously driven to provide the desired torque, thereby permitting use of smaller motors which can reduce the amount of space needed for the motors. Such space considerations are often significant in wing interior spaces.

In the illustrated embodiment, a first motor 940 is coupled to a torque shaft 950, which in turn is coupled to gearboxes 960 to transmit the rotary power to the latch pin actuators 930. Additionally, a backup or second motor 992 may be coupled to the torque shaft 950. In the illustrated embodiment, the second motor 992 is provided adjacent the first motor 940 and is coupled to the torque shaft 950 by a motor gearbox 996. Specifically, the first motor 940 includes an output shaft 984 coupled to the motor gearbox 996 at a first point 985, and the second motor 992 includes an output shaft 986 that is coupled to the motor gearbox 996 at a second point 987. By providing first and second motors 940, 992 that independently couple to the motor gearbox 996, the motors 940, 992 may be used simultaneously as well as alternatively. While a specific location for the second motor 992 is shown in FIG. 9, it will be appreciated that the second motor 992 may be placed in other locations, as long as it is mechanically coupled to the torque shaft 950. In some embodiments, the motor gearbox 996 is a differential.

Each latch pin actuator 930 may include a housing 932, and a gear 934 and roller screw 936 for moving the latch pin 920 in and out of the housing 932. The roller screw 936 is configured to be non-backdriveable. Pitch of the roller screw 936 may be selected so that the roller screw 936 can be turned in one direction by the motor 940, but not turned in an opposite direction by forces acting along an axis of the latch pin 920 (e.g., pushing on the latch pin 920).

Each latch pin actuator 930 is also provided with a lock 938 that is biased towards a locking position by a spring 939. Thus, when the latch pin 920 is extended, the spring 939 forces the locks 938 into a position that prevents the latch pin 920 from being retracted.

Linkages 980 may connect the locks 938 serially with an unlock actuator 970. When actuated, the unlock actuator 970 may rotate the locks 938 simultaneously into an unlock position, which allows the latch pins 920 to be retracted. A backup or second unlock actuator 999 may also be mechanically coupled to the linkages 980 to provide redundancy in the event of failure of the unlock actuator 970 or to provide additional output force.

FIG. 9 illustrates the folding wing 900 with the folding section 902 stowed and the latching system 910 in an unlatched state. The latch pins 920 are fully retracted. The folding section 902 may be deployed by moving it about the hinge line HL. Once the folding section 902 is deployed, one or both of the first and second motors 940, 992 turns the torque shaft 950, which (via the gearboxes 960) turns the gears 934 and roller screws 936. As a result, the latch pins 920 are extended through shear plates and/or torque boxes in both the fixed and folding sections (904 and 902, respectively), thereby latching the folding section 902 to the fixed section 904. The latch pins 920 may be locked automatically. The springs 939 force the locks 938 into a position that prevents the latch pins 920 from being retracted.

First and second brakes 990, 998 may also be provided to brake the torque shaft 950. Thus, the latch pins 920 are locked with two levels of redundancy: non-backdrivability of the mechanical latch pin actuators 930, braking of the torque shaft 950, and mechanical interference by the locks 938. To stow the folding section 902, the unlock actuator 970 is actuated to rotate the locks 938 to an unlocked position, the brakes 990, 998 are released, and the gears 934 and roller screws 936 are turned to retract the latch pins 920 into their housings 932. The folding section 902 is then moved about the hinge line HL to the stowed position.

Manual drive interfaces may be provided to permit manual actuation of the locks 938 and latch pins 920. For example, a latch manual drive interface 991 is mechanically coupled to the torque shaft 950, while a lock manual drive interface 993 is mechanically coupled to one of the linkages 980. Each of the latch manual drive interface 991 and the lock manual drive interface 993 is configured to receive a torque producing tool, such as a socket wrench or square drive wrench. To avoid excessive manual torque, a torque limiting device may be provided or the size of the interface may be selected such that only certain size tools having acceptable maximum torque outputs may be used.

A latch/lock system is not limited to folding wing tips. More generally, it can be applied to a wing having a fixed section and a folding section.

A latching system herein is not even limited to commercial aircraft. For instance, a latching system herein may be applied to wings of other aircraft, helicopter blades, wind generator turbine blades, truck tailgates, folding ramps, robotic arms, etc.

What is claimed is:

1. A folding wing, comprising:
   a fixed section;
   a folding section hinged to the fixed section;
   a latch system for latching the folding section to the fixed section, the latch system including:
      a plurality of latch pins, each latch pin movable along a latch pin axis between a retracted position, in which the latch pin is disengaged from the folding section, and an extended position, in which the latch pin engages the folding section;
      a corresponding plurality of non-backdriveable mechanical latch pin actuators, each non-backdriveable mechanical latch pin actuator being coupled to an associated latch pin and comprising a roller screw configured to move the latch pin between the retracted position and the extended position, the roller screw having a threaded shaft with a pitch that allows one end of the threaded shaft to be turned, but does not allow an opposite end of the threaded shaft to be turned by forces acting along the latch pin axis;
a drive line mechanically coupled to each of the plurality of non-backdriveable mechanical latch pin actuators;
a first motor mechanically coupled to the drive line; and
a second motor mechanically coupled to the drive line independently of the first motor.

2. The folding wing of claim 1, in which the drive line comprises a torque shaft.

3. The folding wing of claim 1, further comprising a first brake operatively coupled to the first motor and a second brake operatively coupled to the second motor.

4. The folding wing of claim 1, in which each non-backdriveable mechanical latch pin actuator includes a housing for an associated latch pin.

5. A folding wing, comprising:
a fixed section;
a folding section hinged to the fixed section;
a latch system for latching the folding section to the fixed section, the latch system including:
a plurality of latch pins, each latch pin movable along a latch pin axis between a retracted position, in which the latch pin is disengaged from the folding section, and an extended position, in which the latch pin engages the folding section;
a corresponding plurality of non-backdriveable mechanical latch pin actuators, each non-backdriveable mechanical latch pin actuator being coupled to an associated latch pin;
a drive line mechanically coupled to each of the plurality of non-backdriveable mechanical latch pin actuators;
a latch manual drive interface mechanically coupled to the drive line;
a corresponding plurality of locks, each lock having an associated latch pin and being rotatable about a lock axis between an unlocked position and a locked position, wherein each lock, when in the locked position, is configured to create physical interference with the associated latch pin;
an unlock actuator operably coupled to the plurality of locks by a linkage; and
a lock manual drive interface mechanically coupled to the linkage.

6. The folding wing of claim 5, in which the drive line comprises a torque shaft.

7. The folding wing of claim 5, further comprising a first brake operatively coupled to the first motor and a second brake operatively coupled to the second motor.

8. The folding wing of claim 5, in which each non-backdriveable mechanical latch pin actuator includes a housing for an associated latch pin, and a roller screw configured to move the latch pin between the retracted position and the extended position, wherein the roller screw is further configured to be non-backdriveable.

9. The folding wing of claim 5, further comprising a second unlock actuator operably coupled to the plurality of locks by the linkage.

10. The folding wing of claim 5, further comprising a latch manual drive interface mechanically coupled to the drive line.

11. The folding wing of claim 5, further comprising a first motor mechanically coupled to the drive line, and a second motor mechanically coupled to the drive line.

12. A latch system for latching a folding section of a wing to a fixed section of the wing, the system comprising:
a plurality of latch pins, each latch pin movable along a latch pin axis between a retracted position, in which the latch pin is disengaged from the folding section, and an extended position, in which the latch pin engages the folding section;
a corresponding plurality of non-backdriveable mechanical latch pin actuators, each non-backdriveable mechanical latch pin actuator being coupled to an associated latch pin;
a drive line mechanically coupled to each of the plurality of non-backdriveable mechanical latch pin actuators;
a latch manual drive interface mechanically coupled to the drive line;
a corresponding plurality of locks, each lock having an associated latch pin and being rotatable about a lock axis between an unlocked position and a locked position, wherein each lock, when in the locked position, is configured to create physical interference with the associated latch pin;
an unlock actuator operably coupled to the plurality of locks by a linkage;
a lock manual drive interface mechanically coupled to the linkage
a first motor mechanically coupled to the drive line; and
a second motor mechanically coupled to the drive line.

13. The latch system of claim 12, further comprising a second unlock actuator operably coupled to the plurality of locks by the linkage.

14. The latch system of claim 12, further comprising a first brake operatively coupled to the first motor and a second brake operatively coupled to the second motor.

15. The latch system of claim 12, in which each non-backdriveable mechanical latch pin actuator includes a roller screw configured to move the latch pin between the retracted position and the extended position and including a threaded shaft having a pitch that allows one end of the threaded shaft to be turned, but does not allow an opposite end of the threaded shaft to be turned by forces acting along the latch pin axis.

16. A folding wing, comprising:
a fixed section;
a folding section hinged to the fixed section;
a latch system for latching the folding section to the fixed section, the latch system including:
a plurality of latch pins, each latch pin movable along a latch pin axis between a retracted position, in which the latch pin is disengaged from the folding section, and an extended position, in which the latch pin engages the folding section;
a corresponding plurality of non-backdriveable mechanical latch pin actuators, each non-backdriveable mechanical latch pin actuator being coupled to an associated latch pin;
a drive line mechanically coupled to each of the plurality of non-backdriveable mechanical latch pin actuators; and
a latch manual drive interface mechanically coupled to the drive line.

17. A folding wing, comprising:
a fixed section;
a folding section hinged to the fixed section;
a latch system for latching the folding section to the fixed section, the latch system including:
a plurality of latch pins, each latch pin movable along a latch pin axis between a retracted position, in which the latch pin is disengaged from the folding section, and an extended position, in which the latch pin engages the folding section;

a corresponding plurality of non-backdriveable mechanical latch pin actuators, each non-backdriveable mechanical latch pin actuator being coupled to an associated latch pin;

a drive line mechanically coupled to each of the plurality of non-backdriveable mechanical latch pin actuators;

a corresponding plurality of locks, each lock having an associated latch pin and being rotatable about a lock axis between an unlocked position and a locked position, wherein each lock, when in the locked position, is configured to create physical interference with the associated latch pin;

an unlock actuator operably coupled to the plurality of locks by a linkage; and a lock manual drive interface mechanically coupled to the linkage.

18. The folding wing of claim 17, in which the hinge extends along a hinge line and the latch pin axis of each latch pin is parallel to the hinge line, and in which the lock axis is orthogonal to the latch pin axis.

19. The folding wing of claim 17, further comprising a second unlock actuator operably coupled to the plurality of locks by the linkage.

* * * * *